(12) United States Patent
Loser et al.

(10) Patent No.: US 10,871,308 B2
(45) Date of Patent: Dec. 22, 2020

(54) HEATING BLOCK HALF-SHELL AND HEATING BLOCK FOR AVOIDING STATIC AIR BUBBLES

(71) Applicant: BOSCH TERMOTECNOLOGIA S.A., Cacia Averio (PT)

(72) Inventors: Florian Loser, Rosenheim (DE); Christian Englisch, Ruhpolding (DE); Gebhard Mayer, Traunstein (DE)

(73) Assignee: BOSCH TERMOTECNOLOGIA S.A., Cacia Averio (PT)

( * ) Notice: Subject to any disclaimer, the term of this patent is extended or adjusted under 35 U.S.C. 154(b) by 248 days.

(21) Appl. No.: 15/757,524

(22) PCT Filed: Aug. 24, 2016

(86) PCT No.: PCT/EP2016/069929
§ 371 (c)(1),
(2) Date: Mar. 5, 2018

(87) PCT Pub. No.: WO2017/036870
PCT Pub. Date: Mar. 9, 2017

(65) Prior Publication Data
US 2018/0252435 A1 Sep. 6, 2018

(30) Foreign Application Priority Data
Sep. 3, 2015 (DE) .......... 10 2015 216 938

(51) Int. Cl.
*F24H 1/10* (2006.01)
*F24H 9/00* (2006.01)
(Continued)

(52) U.S. Cl.
CPC .......... *F24H 9/0015* (2013.01); *A47J 31/542* (2013.01); *F24H 1/103* (2013.01); *F24H 1/121* (2013.01); *H05B 3/40* (2013.01)

(58) Field of Classification Search
None
See application file for complete search history.

(56) References Cited

U.S. PATENT DOCUMENTS 3,088,017 A * 4/1963 Schomann .............. F24H 1/103
392/494
3,230,346 A * 1/1966 Eckerfeld .............. F24H 1/103
392/494
(Continued)

FOREIGN PATENT DOCUMENTS

DE 4208675 A1 * 9/1993 ........... F24H 9/2028
DE 29603842 U1 3/1997
(Continued)

OTHER PUBLICATIONS

International Search Report, issued in International Application No. PCT/EP2016/069929 filed on Aug. 24, 2016, dated Nov. 2, 2016.

*Primary Examiner* — Joseph M. Pelham
(74) *Attorney, Agent, or Firm* — Norton Rose Fulbright US LLP; Gerard Messina

(57) ABSTRACT

A continuous flow heater includes a heating block, where the heating block includes a heating block half-shell for a continuous flow heater. The half-shell includes a partial wall for a heating channel that includes at least one deflection area for a liquid flow. The half-shell further includes, in the deflection area, at least one pin that, in its longitudinal direction, protrudes into the heating channel.

10 Claims, 2 Drawing Sheets

(51) Int. Cl.
*H05B 3/40* (2006.01)
*A47J 31/54* (2006.01)
*F24H 1/12* (2006.01)

(56) References Cited

U.S. PATENT DOCUMENTS

| | | | |
|---|---|---|---|
| 4,602,732 A | 7/1986 | Schaeffer et al. | |
| 5,614,681 A * | 3/1997 | Tada | G01F 1/3209 |
| | | | 73/202 |
| 5,728,946 A * | 3/1998 | Sasaki | G01F 1/3272 |
| | | | 73/861.22 |
| 2008/0216665 A1* | 9/2008 | Hoehne | A47J 31/4485 |
| | | | 99/293 |

FOREIGN PATENT DOCUMENTS

| | | |
|---|---|---|
| DE | 19651087 A1 | 6/1998 |
| DE | 102011082106 A1 | 3/2013 |
| WO | 2011077135 A2 | 6/2011 |

* cited by examiner

HEATING BLOCK HALF-SHELL AND HEATING BLOCK FOR AVOIDING STATIC AIR BUBBLES

CROSS-REFERENCE TO RELATED APPLICATIONS

The present application is the national stage of International Pat. App. No. PCT/EP2016/069929 filed Aug. 24, 2016, and claims priority under 35 U.S.C. § 119 to DE 10 2015 216 938.3, filed in the Federal Republic of Germany on Sep. 3, 2015, the content of each of which are incorporated herein by reference in their entireties.

FIELD OF THE INVENTION

The present invention relates to a heating block half-shell for a continuous flow heater, in particular for a household continuous flow heater. Moreover, the present invention relates to a heating block, and a continuous flow heater that includes a heating block.

BACKGROUND

Conventional electric household continuous flow heaters include one or multiple heating blocks, each including at least one heating channel that generally has a meandering design, through which in each case liquid (in particular water) may be passed through, and in which a heating coil is situated. Between essentially straight sections, the heating channel includes deflection areas in which the channel routing is deflected in a different direction.

This type of heating block can include, in at least one section, two assembled heating block half-shells. Each of the heating block half-shells can form a partial wall for the heating channel. When the two heating block half-shells are assembled, the two partial walls together form a tube that encloses at least a portion of the heating channel.

The heating coil is formed from a heating wire that is generally helically wound around a coil center. The heating coil represents an electrical resistor that heats up when electrical current passes through, and releases heat to the water flowing around it. Water flows directly around the heating coil.

A disadvantage of conventional heating blocks is that air bubbles often settle on the heating coil. These air bubbles may result in overheating and associated burn-out of the heating coil. In particular heating channels through which water flows from top to bottom are susceptible to such adhesion of air bubbles. The reasons are in particular the rising of air in the water, and stationary areas that occur in the deflection areas, in which a local deflection of the flow direction (recirculation) takes place.

SUMMARY

An object of the present invention is to provide a heating block half-shell, a heating block, and a continuous flow heater in a cost-effective manner, with which the above-mentioned disadvantages can be avoided.

According to an example embodiment of the present invention, a heating block half-shell includes a partial wall for a heating channel that includes at least one deflection area for a liquid flow. In the present document, such a deflection area is understood to mean an area that includes a bend in which a heating channel routing undergoes a change in direction by approximately 180° exactly one time.

The deflection area can include mutually parallel sections of the heating channel which adjoin the bend and which function as a feed line and as a discharge line for the bend.

According to the present invention, at least one pin is provided in the deflection area, which in its longitudinal direction (i.e., in a direction of its longitudinal axis, i.e., the longest extension of the pin) protrudes into the heating channel, i.e., is configured for liquid to flow completely around it in a plurality of its cross sections.

Similarly, a heating channel that includes at least one deflection area for a liquid flow is formed in a heating block according to the present invention.

At least one pin which in its longitudinal direction protrudes into the heating channel is provided in the deflection area.

With such a pin in the heating channel, swirls can be generated which counteract the formation of recirculation zones, and thus of air bubbles, in particular at the end of a deflection area. The pin acts as an interfering element in the liquid flow, which, as is known from fluid mechanics, generates a Kármán vortex street, which refers to a phenomenon in which a flow pattern with slightly mutually offset vortices having opposite rotational directions forms behind a body around which flow circulates. The additional circular flows counteract recirculation flows in the deflection area which are produced by the deflection itself. The formation of static air bubbles is thus prevented.

A heating block half-shell according to the present invention and a heating block according to the present invention are easily manufactured with little material outlay, which means a cost-effective technical implementation.

The pin can be designed in particular as a circular cylinder or as a (preferably straight) prism, whose longitudinal direction corresponds to the direction of the geometric height of the circular cylinder or prism.

The heating channel is preferably designed in such a way that, at least in one section of the heating channel, a flow path of a liquid to be conducted through extends essentially in a plane; such a plane is referred to here and in the following discussion as a "flow path plane."

According to a preferred example embodiment of a heating block half-shell and of a heating block, the at least one pin is oriented in such a way that its longitudinal direction is essentially perpendicular to such a flow path plane.

For a pin situated in this way, swirls caused by the pin are situated essentially in planes in parallel to the flow path plane, so that they likewise counteract recirculation flows situated in this plane particularly well.

In particular, the at least one pin preferably protrudes into a radial center of the heating channel, and thus in a heating channel cross section (i.e., a section that is orthogonal to the flow direction) at least approximately reaches the midpoint of the heating channel cross section or even protrudes beyond same.

In this way, liquid flows around the pin in a plurality of its cross sections, in particular in the radial center of the heating channel, and swirls are thus generated there, where the turbulences may spread particularly well.

In a preferred example embodiment, the deflection area in a longitudinal section (i.e., a section in parallel to a flow path plane) is guided essentially along a (preferably axially symmetrical) half of an elliptic ring (i.e., an area between two concentric ellipses), more preferably a circular ring.

In such a deflection area, a continuous deflection of a liquid flow by 180° can be achieved, in which in particular few disadvantageous recirculation flows, which result in the formation of air bubbles, are generated.

According to a preferred example embodiment, the deflection area includes an essentially straight section of the heating channel which in the flow direction is adjoined by a bend that is curved in the flow direction. The bend is configured for deflecting a liquid flow conducted therein by approximately 180°. In the flow direction, the bend is preferably adjoined by an essentially straight section of the heating channel. Cross sections of the flow channel in which the curvature or change in direction (infinitesimally) begins or ends may be regarded as a delimitation of the bend.

The at least one pin can be situated in the essentially straight section that is adjoined by the bend. Alternatively or additionally, the at least one pin (or an additional pin) can be situated in the bend and/or in the essentially straight section adjoining the bend.

The at least one pin (or one of the pins) is preferably situated in an inlet zone of the deflection area in which a liquid flow does not (yet) undergo a change in direction or a change in direction of at most 45°, compared to the essentially straight section, and/or in an outlet zone of the deflection area, up to which a liquid flow has undergone a change in direction by at least 135° with respect to the essentially straight section that is adjoined by the bend.

These zones facilitate the formation of Kármán vortices in such a way that areas in or behind the deflection area in which recirculation flows occur are met by the vortices and thus mitigated.

When such a pin is situated in the inlet zone and also in an outlet zone, in the area of potential air bubble adhesion (in the outlet zone) vortices of different diameters are generated, namely, vortices having a larger diameter that result from the further flow of vortices that have been generated by a pin in the inlet area, and vortices having a smaller diameter that have only just been generated in the outlet area. The different sizes and associated forces cause turbulences which prevent air bubble adhesion in a particularly effective manner.

In a preferred example embodiment, the deflection area is essentially symmetrical with respect to a plane of symmetry and includes at least two pins that are likewise symmetrical with respect to the plane of symmetry. The plane of symmetry is preferably orthogonal to a flow path plane.

Such a design of a heating block half-shell and a heating block allows in particular a simple manufacture.

According to a preferred example embodiment of a heating block half-shell, the at least one pin includes an exposed end with a connecting element that is configured for connection to an exposed end of a counter pin of a second heating block half-shell. The connecting element can be part of a plug-in connection, for example. The connecting element can include a protruding journal, for example, that is configured for insertion into a groove or a mortise. Alternatively, the connecting element can include such a groove or such a mortise that is configured for accommodating a corresponding journal.

A heating block half-shell of this specific embodiment can be combined particularly well with another heating block half-shell of the same specific embodiment in such a way that the assembled pins pass completely through the heating channel and thus traverse the flow path. The described favorable Kármán vortices can thus be consistently generated in the cross-sectional direction.

Accordingly, in a preferred example embodiment of a heating block, the at least one pin is designed in such a way that it completely traverses the heating channel in a direction orthogonal to a flow path plane.

According to a preferred example embodiment, a heating block half-shell and a heating block includes a first deflection area and a second deflection area that deflect the liquid flow in mutually opposite directions. The first deflection area can include at least one pin in one of the configurations described above or stated below, whereas the second deflection area can conduct a liquid flow unhindered, i.e., in particular does not include a pin.

Such a heating block or a heating block that includes such a heating block half-shell is suited in particular for use in a continuous flow heater in which (in the appropriate orientation for use) a liquid flow is provided in the heating channel, which includes vertical sections, for example between the respective deflection areas, and conducts liquid in alternation with and against the force of gravity. The pins can be situated only at the deflection areas, in which a deflection from an upwardly directed flow to a downwardly directed flow takes place; these deflection points are particularly susceptible to adhesion of air bubbles, whereas at the reverse deflection points, such adhesion can already be prevented by the rising of air in the water, so that generation of vortices by the stated pins can be unnecessary.

For such uses, the stated specific embodiments thus advantageously save material and manufacturing expenditure.

The heating channel in the heating block is preferably formed from a housing together with the least one pin made of plastic. Accordingly, the heating block half-shell, the same as the at least one pin situated therein, is likewise preferably made of plastic. The pins can be produced separately, and inserted into the housing or heating block half-shell and thus sealed (welded, for example), or the housing and pin or the heating block half-shell and pin can be integrally formed, i.e., in one seamless piece, for example with the aid of a thermoplastic process or injection molding process.

A heating block according to the present invention can include at least one heating coil in the heating channel. At least one section of this heating coil can be situated in at least one portion of a deflection point, with and/or without a pin. A heating block according to the present invention can in particular include a housing that includes two assembled heating block half-shells, at least one of which is a specific embodiment of a heating block half-shell according to the present invention. Alternatively, the heating block according to the present invention can include a one-piece housing, or a housing that includes joined straight tube sections and deflection elements, for example.

According to an example embodiment, a continuous flow heater, in particular a household continuous flow heater, includes a heating block half-shell or a heating block according to one of the described specific embodiments.

In particular, a continuous flow heater can include a heating block in which a heating channel is provided with deflection sections, and includes vertical sections in the orientation of the continuous flow heater appropriate for proper functioning. The heating channel preferably includes multiple deflection sections, of which first deflection sections are configured for deflecting a vertically ascending liquid flow in a vertically ascending direction, and second deflection sections are configured for deflecting a vertically descending liquid flow in a vertically descending direction.

Preferably just the first deflection sections in each case include pins, each of which protrudes in its longitudinal direction into the heating channel, and the second deflection sections are preferably provided without pins in the heating channel.

Preferred exemplary embodiments of the present invention are explained in greater detail below with reference to drawings. It is understood that individual elements and components can also be combined in a different way than described above or stated below.

DETAILED DESCRIPTION

Figure 1:
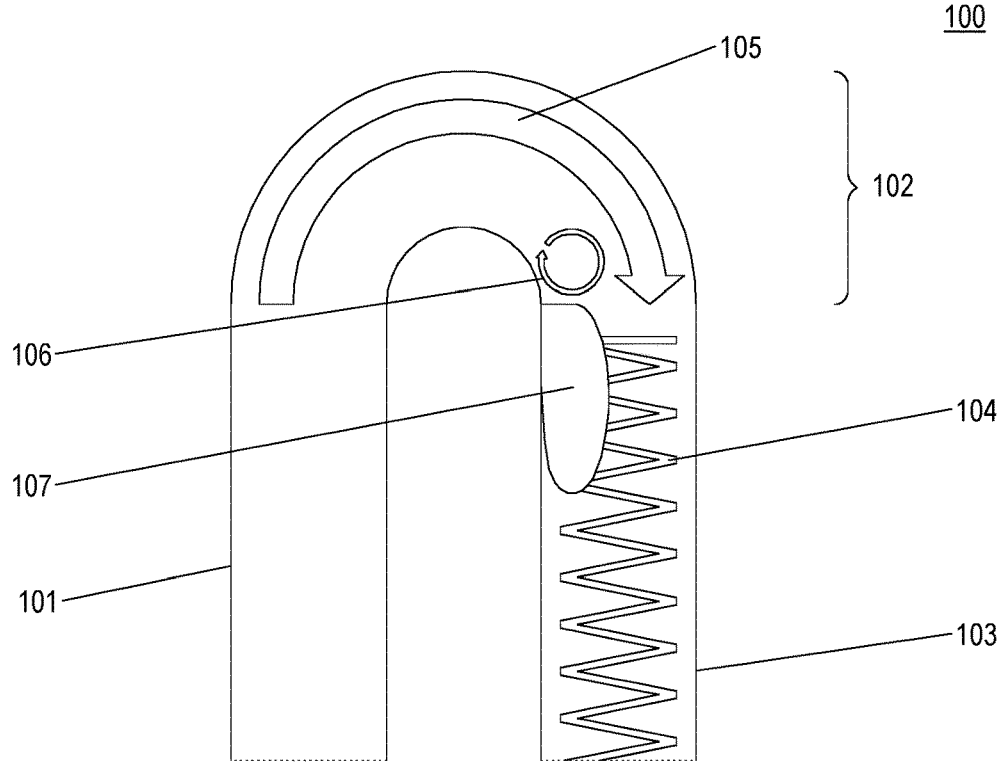
FIG. 1 shows a plan view of a deflection area of a conventional heating channel.

FIG. 1 illustrates a plan view (i.e., a longitudinal section) of a deflection area 100 of a conventional heating channel. The deflection area includes a bend 102 and straight heating channel sections 101 and 103 of which, as is apparent from flow direction 105 schematically indicated by the arrow, straight heating channel section 101 is used as a feed line, and straight heating channel section 103 is used as a discharge line, of a liquid flow in and out, respectively, of bend 102. A heating coil 104 is situated in straight heating channel section 103.

As schematically illustrated by circular arrow 106, the change in direction of the liquid flow creates a recirculation, which causes disadvantageous adhesion of an air bubble 107 to the wall of the heating channel in deflection area 100.

Figure 2:
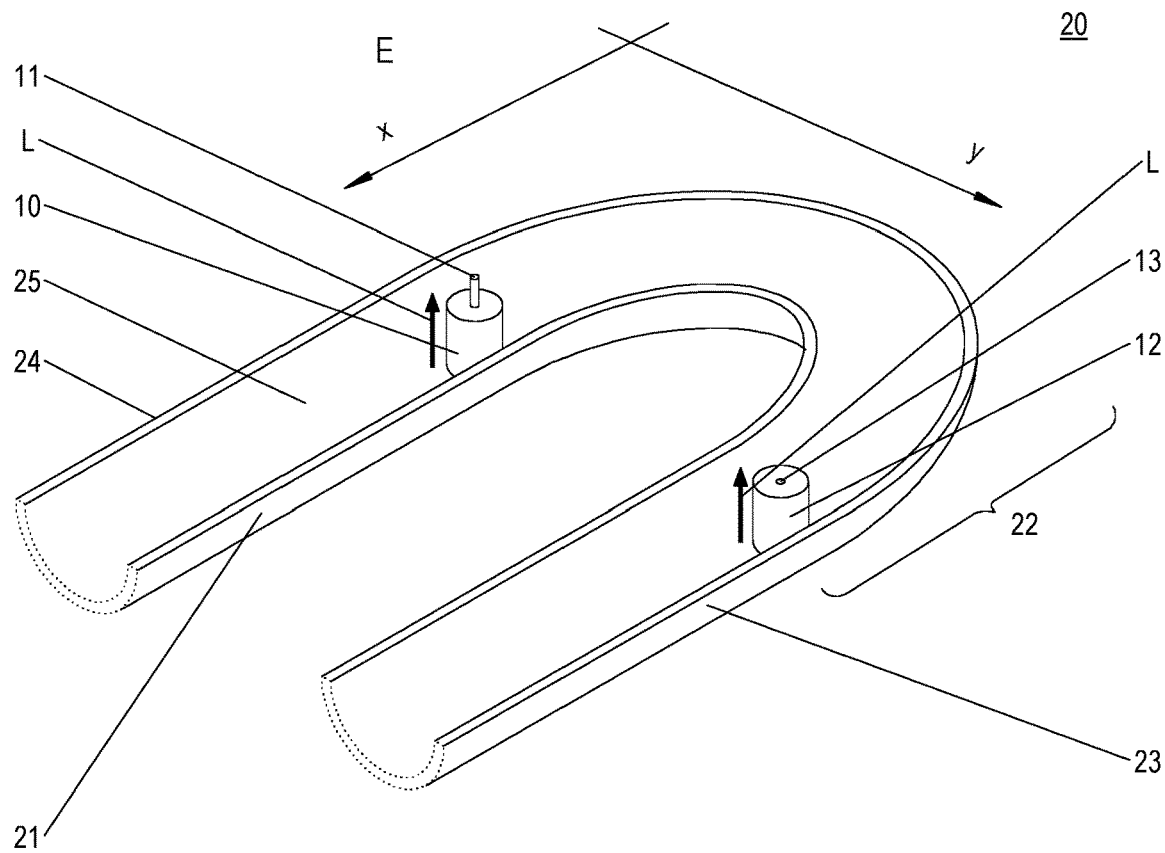
FIG. 2 is a perspective view of a heating block half-shell according to an example embodiment of the present invention.

FIG. 2 shows a perspective illustration of a deflection area 20 of a heating block half-shell according to an example embodiment of the present invention, which includes a partial wall 24 (in the present case, one-half of a wall) for a heating channel 25. The deflection area includes a bend 22 and straight sections 21 and 23, which can be used as feed and discharge lines, respectively, for the bend. The cross sections in which the change in direction (infinitesimally) begins or ends can be regarded as a delimitation of the bend.

The heating channel in the illustrated section is designed in such a way that a flow path of a liquid to be conducted through extends in a flow path plane E specified by the indicated x-y coordinate system.

In the longitudinal section in parallel to the flow path plane, the deflection area with bend 22 includes a section that leads essentially along one-half of an elliptic ring. This half of the elliptic ring is axially symmetrical with respect to an axis of symmetry that extends in parallel to the x axis.

In addition, deflection area 20 also has a design that is symmetrical, in particular with respect to a plane of symmetry (not depicted) that is situated orthogonally with respect to flow path plane E and has a direction in parallel to the x axis.

Pins 10, 12 having a circular cylindrical shape are situated in deflection area 20, and in their longitudinal direction L each protrude into heating channel 25. Pins 10, 12 are each situated perpendicularly with respect to flow path plane E.

Pins 10, 12 include an exposed end with a connecting element 11, 13, respectively. Connecting element 11 is designed as a journal in the illustrated exemplary embodiment. In contrast, connecting element 13 is a mortise which is complementary to connecting element 11. As is apparent from the illustration, connecting elements 11, 13 are each configured for connection to a suitable other connecting element of a counter pin of a second heating block half-shell (not shown). Such a suitable connecting element would have one of the respective complementary shapes. Thus joined, the overall pins formed in each case from the pin and counter pin would completely traverse a heating channel enclosed by the two heating block half-shells, thus generating advantageous turbulences, as explained with reference to FIG. 3a.

Figure 3A:
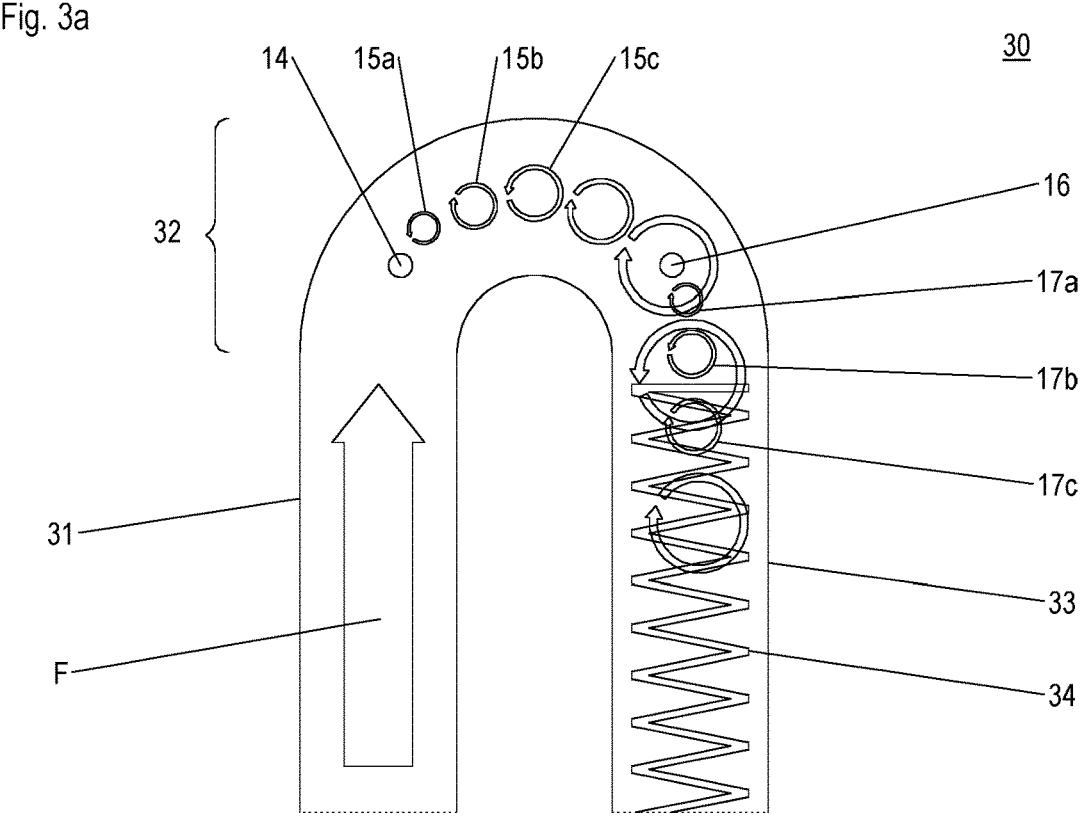
FIG. 3a is a plan view that shows an operating principle of a heating channel according to an example embodiment of the present invention.

FIG. 3a schematically illustrates a plan view (i.e., in the longitudinal section in parallel to a flow path plane) of a deflection area 30 of a heating channel according to an example embodiment of the present invention, and the operating principle thereof.

Deflection area 30 includes a bend 32 and straight sections 31, 33, of which section 31 is used as a feed line section, as is apparent from the flow direction indicated by the arrow. A heating coil 34 for heating the liquid conducted through is situated in discharge line section 33.

Pins 14, 16 are situated within bend 32 in deflection area 30, and according to an example embodiment of the present invention each protrudes (not illustrated) in their longitudinal direction into the heating channel.

Impingement of liquid flow F on pin 14 causes the formation of a chain of alternating, oppositely directed vortices, which in particular includes vortices 15a, 15b, 15c. The vortex radius increases with increasing distance from pin 14 as the flow obstruction.

Similarly, when the liquid flow impinges on pin 16, another chain of alternating, oppositely directed vortices, which in particular includes vortices 17a, 17b, 17c, is generated. The radius of these vortices also increases with increasing distance from the flow obstruction that generates them, which in the present case is pin 16.

Overall, the two vortex chains create turbulences in the deflection area which prevent adhesion of air bubbles.

In fact, it has been determined in experiments that in a conventional design of the deflection areas, such air bubbles form up to a flow rate of 4 L/min. With a heating block according to an example embodiment of the present invention, it has been possible to prevent air bubbles from settling above a flow rate of 2.5 L/min.

Figure 3B:
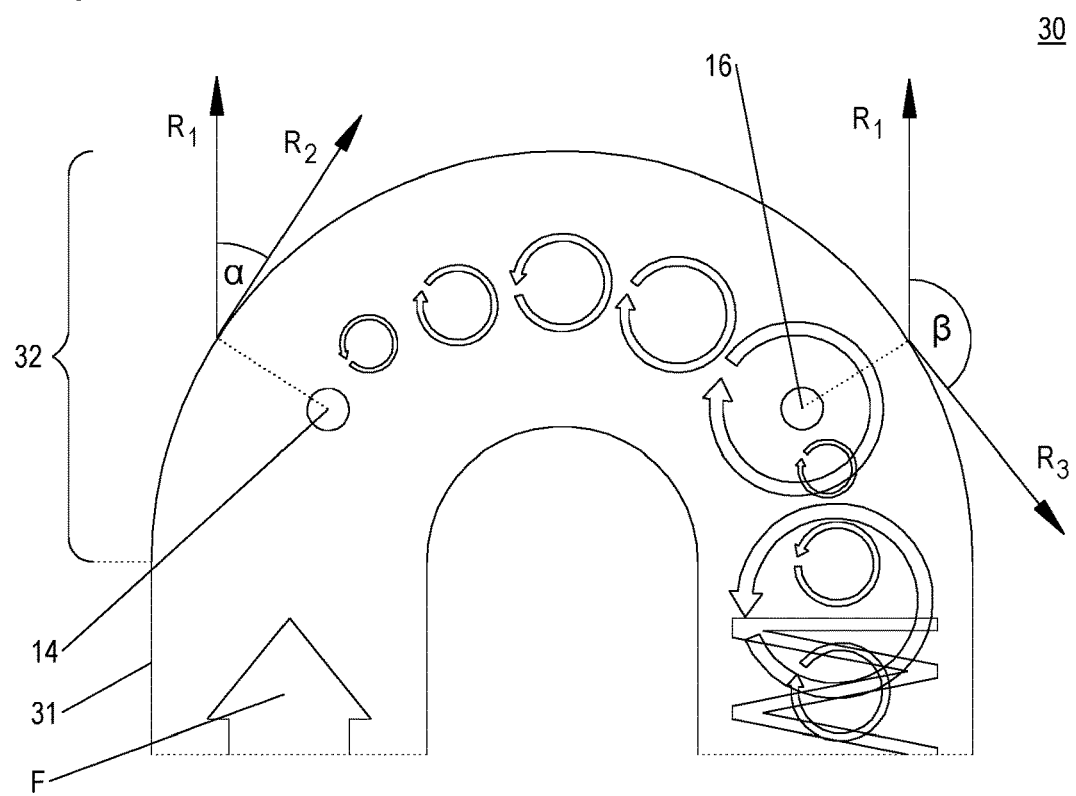
FIG. 3b shows a detail of the deflection area in FIG. 3a, according to an example embodiment of the present invention.

Lastly, FIG. 3b shows a detail of deflection area 30 in enlarged scale. It is apparent that the two pins 14, 16 are situated within the bend, i.e., in an area in which the flow direction has already undergone a change. While liquid flow F in straight section 31, as the feed line section, has a direction $R_1$, the liquid flow at pin 14 is deflected in a direction $R_2$ and by an angle $\alpha$. This angle in the present case is less than 45°.

At pin 16, the liquid flow has already been deflected by an angle $\beta$ in a direction $R_3$, and angle $\beta$ is greater than 135°.

As described above, such angles for the generation of favorable vortex chains are particularly advantageous for preventing air bubbles from settling.

What is claimed is:

1. A heating block half-shell for a continuous flow heater, the heating block half-shell comprising:
    a partial wall of a heating channel, wherein the heating channel includes a deflection area for a liquid flow; and
    at least one pin that is in the deflection area and that, in its longitudinal direction, protrudes into the heating channel,
    wherein the deflection area, in a longitudinal section that is parallel to a flow path plane, includes a section that is guided essentially along one-half of an elliptic ring.

2. The heating block half-shell of claim 1, wherein the at least one pin extends essentially perpendicularly with respect to a flow path plane in which the flow path extends.

3. The heating block half-shell of claim 1, wherein the deflection area in the flow direction is adjoined by an essentially straight section of the heating channel; and
the at least one pin is situated in an inlet zone of the deflection area in which a liquid flow undergoes no change in direction or a change in direction of at most 45° compared to the essentially straight section.

4. The heating block half-shell of claim 1, wherein the deflection area in the flow direction is adjoined by an essentially straight section of the heating channel; and
the at least one pin is situated in an outlet zone of the deflection area up to which a liquid flow has undergone a change in direction by at least 135° with respect to the essentially straight section.

5. A heating block for a continuous flow heater, the heating block half-shell comprising:
a partial wall of a heating channel, wherein the heating channel includes a deflection area for a liquid flow; and
at least one pin that is in the deflection area and that, in its longitudinal direction, protrudes into the heating channel,
wherein the deflection area is symmetrical with respect to a plane of symmetry, and the at least one pin includes at least two pins that are likewise symmetrical with respect to the plane of symmetry.

6. A heating block for a continuous flow heater, the heating block half-shell comprising:
a partial wall of a heating channel, wherein the heating channel includes a deflection area for a liquid flow; and
at least one pin that is in the deflection area and that, in its longitudinal direction, protrudes into the heating channel,
wherein the at least one pin includes an exposed end with a connecting element that is configured for connection to an exposed end of a counter pin of a second heating block half-shell.

7. A heating block for a continuous flow heater, the heating block comprising:
a heating channel that includes at least one deflection area for a liquid flow; and
at least one pin that is in the at least one deflection area and that, in its longitudinal direction, protrudes into the heating channel,
wherein the at least one pin extends essentially perpendicularly with respect to a flow path plane in which a flow path extends.

8. The heating block of claim 7, wherein the at least one deflection area includes at least two deflection areas, at least one of which is provided without any of the at least one pin.

9. A heating block, for a continuous flow heater, the heating block comprising:
a heating channel that includes at least one deflection area for a liquid flow; and
at least one pin that is in the at least one deflection area and that, in its longitudinal direction, protrudes into the heating channel,
wherein the heating block includes two heating block half-shells, at least one of which includes a partial wall of the heating channel and includes one or more of the at least one pin,
wherein the deflection area, in a longitudinal section that is parallel to a flow path plane, includes a section that is guided essentially along one-half of an elliptic ring.

10. An electric continuous flow heater comprising a heating block, wherein the heating block includes:
a heating channel that includes at least one deflection area for a liquid flow; and
at least one pin that is in the at least one deflection area and that, in its longitudinal direction, protrudes into the heating channel,
wherein the at least one pin extends essentially perpendicularly with respect to a flow path plane in which a flow path extends.

\* \* \* \* \*